(12) United States Patent
King

(10) Patent No.: US 11,244,341 B2
(45) Date of Patent: *Feb. 8, 2022

(54) METHOD AND SYSTEM FOR FACILITATING ACCESS TO A PROMOTIONAL OFFER

(71) Applicant: RetailMeNot, Inc., Austin, TX (US)

(72) Inventor: Guy Phillip William King, Prahan (AU)

(73) Assignee: RETAILMENOT, INC., Los Angeles, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 16/592,375

(22) Filed: Oct. 3, 2019

(65) Prior Publication Data
US 2020/0034866 A1 Jan. 30, 2020

Related U.S. Application Data

(63) Continuation of application No. 16/386,008, filed on Apr. 16, 2019, now Pat. No. 10,489,814, which is a
(Continued)

(51) Int. Cl.
*G06Q 30/00* (2012.01)
*G06Q 30/02* (2012.01)

(52) U.S. Cl.
CPC ......... *G06Q 30/0225* (2013.01); *G06Q 30/02* (2013.01); *G06Q 30/0211* (2013.01);
(Continued)

(58) Field of Classification Search
None
See application file for complete search history.

(56) References Cited

U.S. PATENT DOCUMENTS 5,812,769 A 9/1998 Graber et al.
5,974,549 A * 10/1999 Golan ............... G06F 9/468
714/47.3
(Continued)

FOREIGN PATENT DOCUMENTS

CA 2592517 7/2006

OTHER PUBLICATIONS

Flash Content Accessibility, Oct. 5, 2004, webaccessibility.gmu.edu/docs/accessible%20Macromedia.doc, 6 pp (Year: 2004).*
(Continued)

*Primary Examiner* — Michael W Schmucker
(74) *Attorney, Agent, or Firm* — Womble Bond Dickinson (US) LLP

(57) ABSTRACT

A method of facilitating access to a promotional offer, the method comprising: receiving at a server system a page request from a client device; and sending program code executable in a browser application to the client device in response to the page request, the program code being executable to display at least one promotional offer and a promotional code, to provide a flash object at a display position of the promotional code and, in response to selection of the flash object, to cause the promotional code to be copied to a user-accessible memory of the client device and to open a new browser display of the browser application.

20 Claims, 5 Drawing Sheets

Related U.S. Application Data continuation of application No. 16/208,437, filed on Dec. 3, 2018, now Pat. No. 10,296,931, which is a continuation of application No. 15/455,908, filed on Mar. 10, 2017, now Pat. No. 10,290,015, which is a continuation of application No. 14/081,072, filed on Nov. 15, 2013, now Pat. No. 9,626,688, which is a continuation of application No. 13/585,576, filed on Aug. 14, 2012, now Pat. No. 8,612,288, which is a continuation of application No. 12/841,071, filed on Jul. 21, 2010, now abandoned.

(60) Provisional application No. 61/232,241, filed on Aug. 7, 2009.

(52) U.S. Cl.
CPC ..... *G06Q 30/0239* (2013.01); *G06Q 30/0245* (2013.01); *G06Q 30/0277* (2013.01)

(56) References Cited

U.S. PATENT DOCUMENTS

| | | | | |
|---|---|---|---|---|
| 6,862,575 | B1* | 3/2005 | Anttila | G06Q 30/02 705/14.14 |
| 2001/0042010 | A1* | 11/2001 | Hassell | G06Q 30/0225 705/14.13 |
| 2002/0010623 | A1 | 1/2002 | McCollom et al. | |
| 2002/0010627 | A1 | 1/2002 | Lerat | |
| 2002/0103698 | A1 | 4/2002 | Cantrell | |
| 2002/0065713 | A1* | 5/2002 | Awada | G06Q 30/0239 705/14.39 |
| 2005/0075926 | A1 | 4/2005 | Liu et al. | |
| 2005/0143052 | A1* | 6/2005 | Pradhan | G06Q 30/0276 455/414.1 |
| 2005/0144072 | A1* | 6/2005 | Perkowski | G06Q 30/0277 705/14.49 |
| 2006/0047639 | A1* | 3/2006 | King | G06F 16/433 |
| 2006/0053048 | A1 | 3/2006 | Tandetnik | |
| 2007/0136657 | A1* | 6/2007 | Blumenthal | G06F 16/748 715/201 |
| 2008/0140520 | A1* | 6/2008 | Hyder | G06Q 30/0207 705/14.1 |
| 2008/0167946 | A1* | 7/2008 | Bezos | G06Q 30/0201 705/14.16 |
| 2008/0195969 | A1* | 8/2008 | Brown | G06F 3/04847 715/802 |
| 2008/0270231 | A1 | 10/2008 | Li et al. | |
| 2009/0288012 | A1* | 11/2009 | Hertel | G06Q 20/326 715/738 |

OTHER PUBLICATIONS

Overlaid Empty Flash Movie, Sep. 4, 2006, http://forums.adobe.com/message/271578?start=0, 3 pp (Year: 2006).*

Wickham's XHTML & CSS tutorial, Aug. 19, 2007, http://web.archive.orh/web/20070819034904/http://www.wickham43.net/divboxes.php, 9 pp (Year: 2007).*

RetailMeNot's Clicks! Are all clicks created equal?, Dec. 16, 2008, http://www.abestweb.com/forums/unethical-affiliates-463/retailmenots-clicks-all-clicks-created-equal-114200.html, 9 pp (Year: 2008).*

Magistrate Report and Recommendation dated Nov. 27, 2019 in C.A. No. 18-937-CFC-MPT *Retailmenot, Inc.* vs. *Honey Science Corp.* (49 Pages).

Examiner's Report for Canadian Application No. 3,055,615 dated Mar. 24, 2021, 8 pages.

Web Archive of CouponMountain.com, <https://web.archive.org/web/20071118190401/http://www.couponmountain.com/>, captured Nov. 18, 2007, 5 pages.

Web Archive of CouponMountain.com, <https://web.archive.Org/web/20090805235349/http://www.couponmountain.com/>, captured Aug. 5, 2008, 5 pages.

Web Archive of Wickham43.com, <https://web.archive.org/web/20090314015441/http://www.wickham43.com:80/tutorial-php-xhtml/divboxes.php>, captured Mar. 14, 2009, 7 pages.

Web Archive of Adobe.com, <https://www.web.archive.org/web/20090209145702/http://www.adobe.com:80/accessibility/products/flash/faq.html>, captured Feb. 9, 2009, 3 pages.

Web Archive of Adobe.com, <https://web.archive.org/web/20090221155420/http://www.adobe.com:80/accesisibility/products/flash/best_practices.html>, captured Feb. 21, 2009, 7 pages.

Web Archive of RetailMeNot.com, <https://web.archive.Org/web/20080702010644/http://www.retailmenot.com/>, captured Jul. 2, 2008, 5 pages.

* cited by examiner

METHOD AND SYSTEM FOR FACILITATING ACCESS TO A PROMOTIONAL OFFER

RELATED APPLICATION

This application is a continuation of and claims priority to U.S. patent application Ser. No. 16/386,008 filed Apr. 16, 2019, which is a continuation of and claims priority to U.S. Pat. No. 10,296,931 issued on May 21, 2019, which is a continuation of and claims priority to U.S. Pat. No. 10,290,015 issued on May 14, 2019, which is a continuation of and claims priority to U.S. Pat. No. 9,626,688 issued on Apr. 18, 2017, which is a continuation of and claims priority to U.S. Pat. No. 8,612,288 issued on Dec. 17, 2013, which is a continuation of and claims priority to U.S. patent application Ser. No. 12/841,071, filed Jul. 21, 2010, which claims priority to U.S. Provisional Patent Application 61/232,241 filed Aug. 7, 2009, each of which is incorporated by reference in its entirety.

TECHNICAL FIELD

The described embodiments relate to methods and systems for facilitating access to a promotional offer. Some particular embodiments relate to display of a promotional offer, such as a coupon, with a promotional code that can be used to accept the promotional offer.

BACKGROUND

Coupons can be used as a form of promotional offer to induce a potential customer to purchase a product or service. For example, the promotional offer may involve providing a product or service at a discounted price and this can be represented in the form of a coupon having a coupon code. The coupon code may be used by the entity making the promotional offer to validate the coupon.

Some coupons may be made available on a website, from which the coupons may be printed for physical presentation of the coupon at a retail establishment or, in some instances, for presentation when making an online purchase of a product or service to which the coupon applies.

SUMMARY

Some embodiments comprise a method of facilitating access to a promotional offer, the method comprising:
  receiving at a server system a page request from a client device; and
  sending program code executable in a browser application to the client device in response to the page request, the program code being executable to display at least one promotional offer and a promotional code, to provide a flash object at a display position of the promotional code and, in response to selection of the flash object, to cause the promotional code to be copied to user-accessible memory of the client device and to open a new browser display of the browser application. The program code may be further executable to automatically direct the new browser display to a first uniform resource locator (URL) associated with the server system. The new browser display may comprise a new browser window or a new page display in the original browser window.

The first URL may map to a server-side script or code resource hosted by the server system. In response to a serve request for the first URL from the browser application, the server system may record selection of the promotional code. The first URL may be unique to the promotional code. The server system may be configured to identify a second URL based on the serve request, the second URL being associated with a different server, the different server tracking usage of the promotional code. The second URL may map to a different server-side script or code resource hosted by the different server.

The server system may automatically redirect the new browser display to the second URL. The second URL may be allocated by an affiliate entity to an entity associated with the server system for use in relation to display of the promotional offer in one or more web pages served by the server system. The second URL may be unique to an offeror of the promotional offer and the server system. The first URL may comprise an identifier of the promotional code.

In alternative embodiments, the program code may be further executable to automatically direct the browser application to an affiliate URL associated with an affiliate server. The affiliate URL may be allocated by an affiliate entity to an entity associated with the server system for use in relation to display of the promotional offer in one or more web pages served by the server system.

The program code may be further executable to cause an instructional message to be displayed adjacent the promotional code in response to navigation to the flash object. The flash object may be configured to be transparent and may be overlaid on the displayed promotional code. Alternatively, the flash object may comprise at least one rendering of the promotional code. In other words, the flash object may itself contain the text/content of the promotional code.

The promotional offer can be claimed by pasting the promotional code from the clipboard into a field on a webpage of an offeror's website. The promotional offer may be displayed in conjunction with a feedback section configured to allow a user to provide feedback input in relation to the promotional offer, wherein the feedback section provides for at least one of voting and commenting.

The program code may further cause a rating indication to be displayed in relation to the promotional offer, the rating indication indicating at least one of a redemption success rate based on user feedback and a user voting history, and may further cause a histogram to be displayed in relation to historical user feedback regarding the promotional offer.

The new browser display may comprise a display window distinct from other displays displayed on the client device. The user-accessible memory may comprise a clipboard of the client device.

Some embodiments relate to a method of facilitating access to a promotional offer, the method comprising:
  displaying, using a browser application of a client device, at least one promotional offer and a promotional code;
  providing a flash object at a display position of the promotional code; and
  in response to selection of the flash object, causing the promotional code to be copied to user-accessible memory of the client device and opening a new browser display using the browser application.

Some embodiments relate to computer-readable storage storing executable program instructions which, when executed by a computing device, cause the computing device to perform the described methods.

Some embodiments relate to a system or computing device comprising means for performing the described methods.

Some embodiments relate to a system comprising:

at least one processing device; and memory comprising program instructions executable by the at least one processing device to cause the system to perform the described methods.

BRIEF DESCRIPTION OF THE DRAWINGS

Embodiments are described in further detail below, by way of example, with reference to the accompanying drawings, in which.

DETAILED DESCRIPTION

Described embodiments relate generally to methods and systems for facilitating access to a promotional offer. The promotional offer may be one of many provided on a website that specialises in making large numbers of promotional offers available to consumers for many different retailers. The promotional offers may be presented in the form of a coupon, for example.

A user may navigate to a coupon-sharing website, for example, where promotional offers in the form of coupons from many different retailers or service providers may be displayed and searched. Although it is common to describe web pages as being displayed on a website, the actual display occurs using a browser application on a client computing device that receives code from a web server hosting the website in response to a serve request for a web "page". The code thus received by the client computing device is then executed by the browser application, if possible, to display the requested web page. It is in this context that embodiments are further described.

Figure 1:
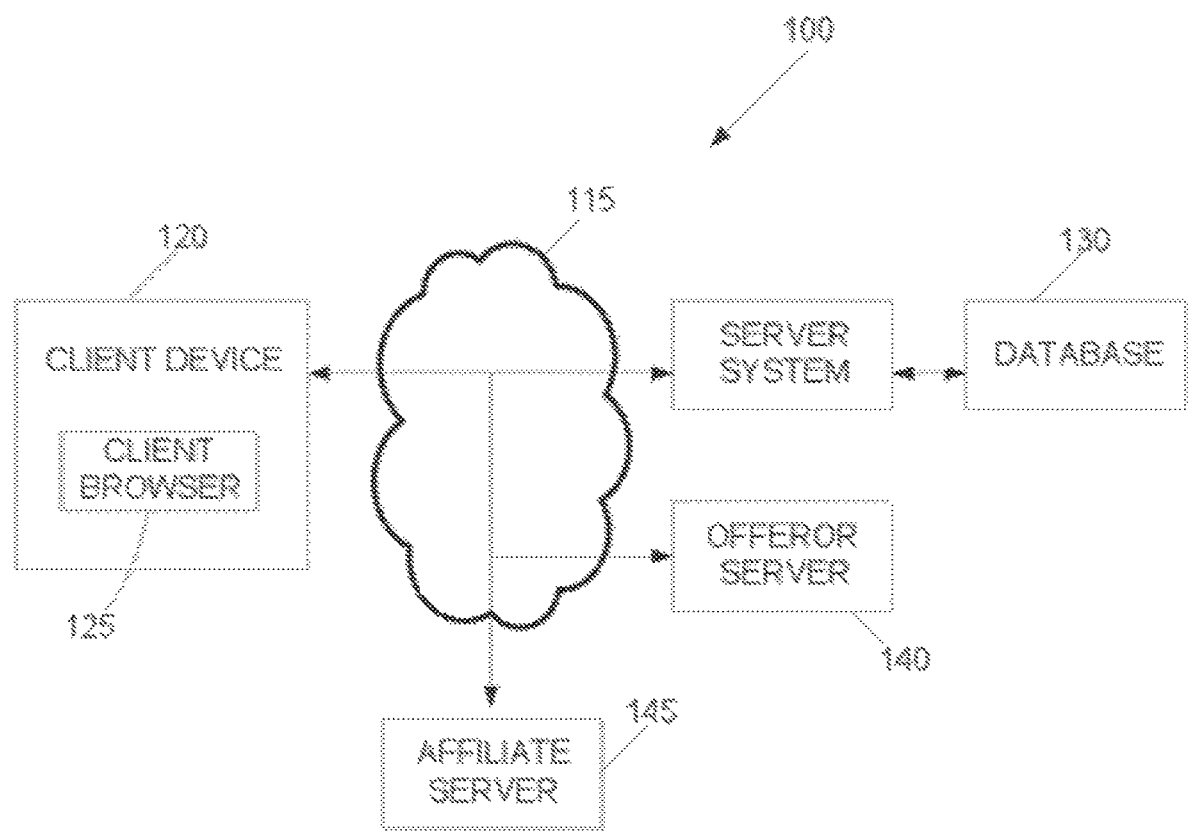
FIG. 1 is a block diagram of a system for facilitating access to a promotional offer.
Figure 4:
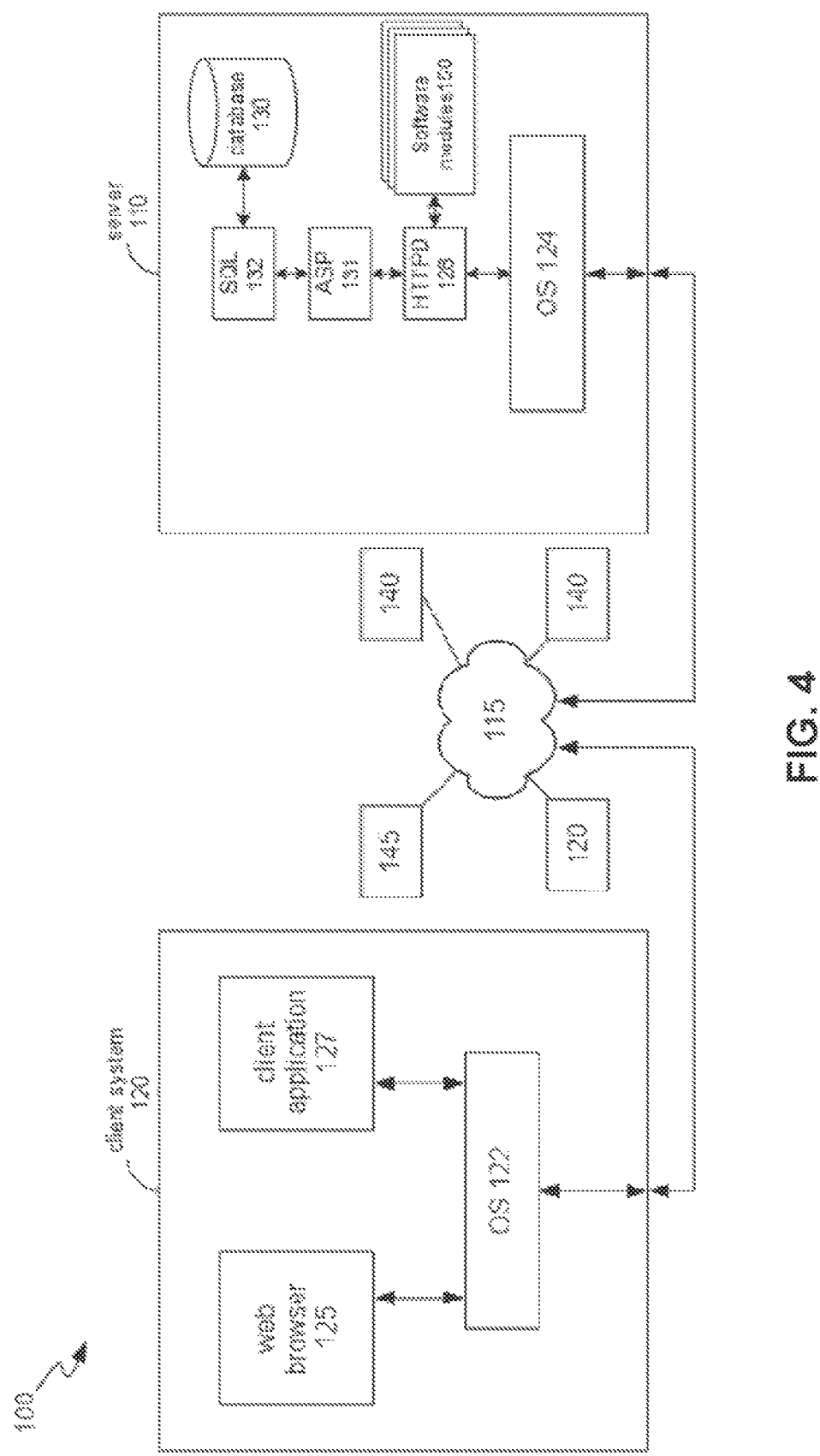
FIG. 4 is a block diagram of a client-server architecture, in the context of which some embodiments may be employed.
Figure 5:
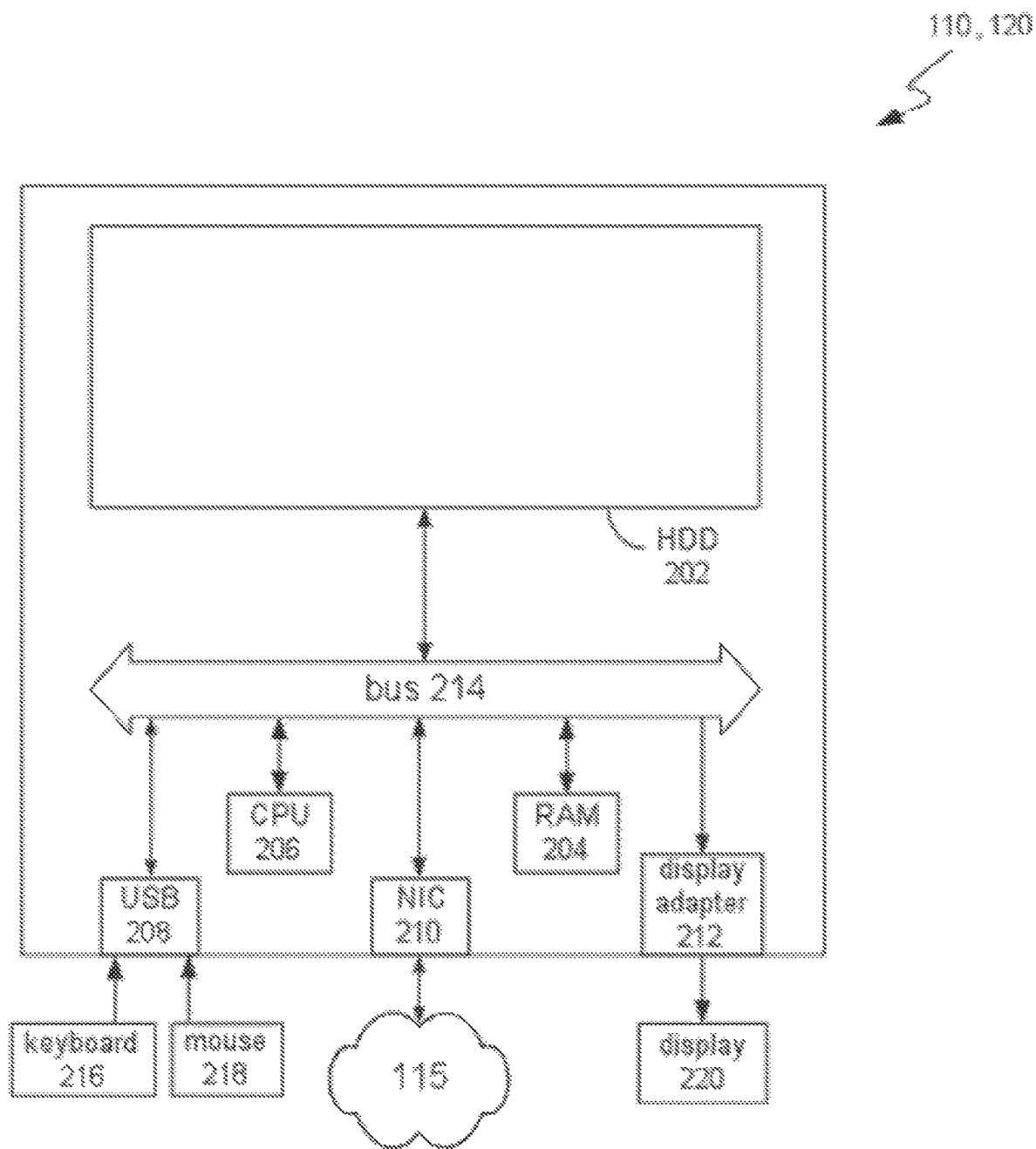
FIG. 5 is a block diagram of an example computing device.

Referring generally to FIG. 1, a system 100 for facilitating access to a promotional offer is described in further detail. Aspects of system 100 are also shown and described by way of example with reference to FIGS. 4 and 5. System 100 comprises a server system 110 and a client computing device 120 in communication with each other over a network 115, such as the Internet. System 100 further comprises a database 130 accessible to server system 110 for storing data pertinent to operation of server system 110 and provision of service to client computing device 120. System 100 further comprises an offeror server 140 and an affiliate server 145 in communication with server system 110 and client computing device 120 over network 115.

Client computing device 120 may comprise a desktop, mobile or handheld computing device having at least one processor (e.g. CPU 206), one or more forms of memory 202, 204, an operating system 122 and a user interface. The memory may comprise volatile (e.g. RAM 204) and non-volatile (e.g. hard disk drive 202, solid state drive, flash memory and/or optical disc) storage. The user interface may comprise a display 220 and at least one input device, such as a touch-screen, a keyboard 216, mouse 218, stylus or other peripheral device that can be used for providing user input to client computing device 120.

A number of software applications or applets may be executing or executable by at least one processor to perform various device-related functions. Such applications may be stored in the non-volatile memory 202 of computing device 120. At least one such software application includes a browser application 125 for enabling a user to navigate to sites accessible over the network 115 to receive content therefrom. Other client software applications 127 may execute on client system 120 using operating system 122.

Figure 2:
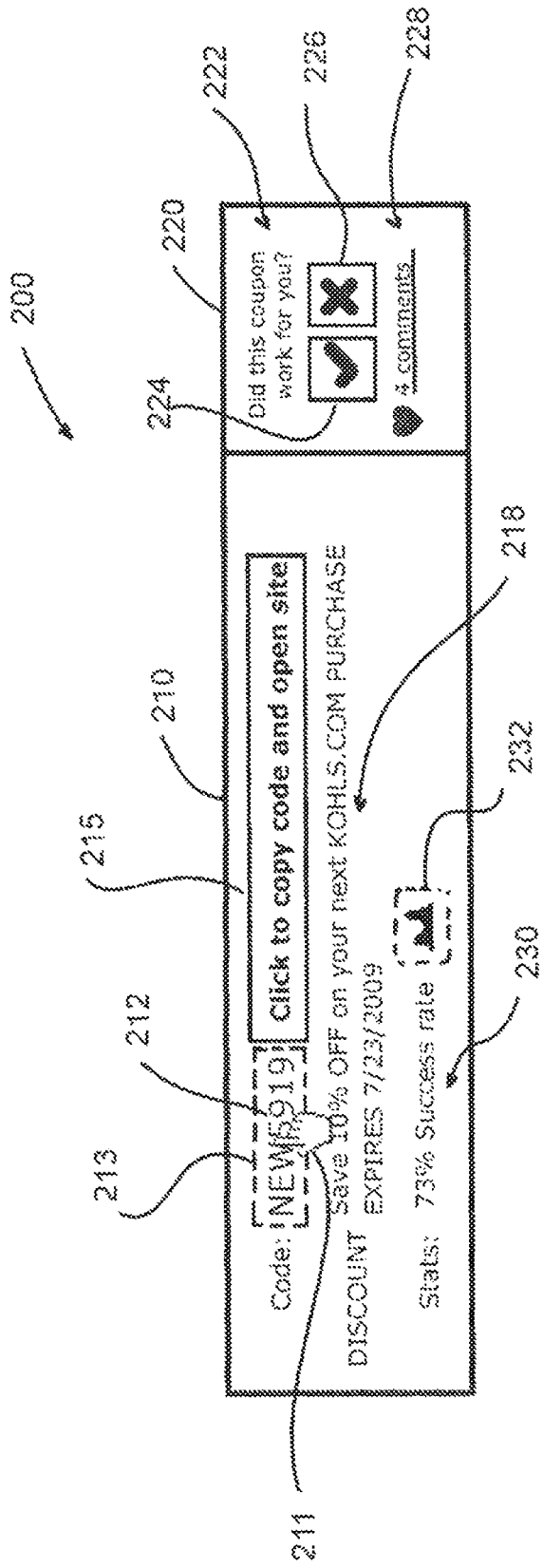
FIG. 2 is an example display of a promotional offer according to some embodiments.

In the example of system 100 illustrated in FIG. 1, client browser 125 can be used to communicate with server system 110 to request content therefrom, in the form of one or more web pages provided as program code executable by the browser application 125. According to some embodiments, server system 110 is configured to provide at least one promotional offer, and more likely many such promotional offers, for consideration by a user viewing web pages via browser application 125. Thus, server system 110 may act as a coupon sharing site. FIG. 2 illustrates an example display 200 of a promotional offer displayable by browser application 125 according to code received from server system 110.

Server system 110 may display (or have accessible for display) a large number of promotional offers, one or more of which are offered by or associated with a product or service provider or an onseller or reseller of such products or services (i.e. a retailer), termed herein for convenience as the "offeror". The offeror server 140 is thus a web server hosted by or on behalf of the offeror and making available web pages associated with the product or service to which the promotional offer (viewable by the user by accessing server system 110) relates. The promotional offer may thus be used as a means of, among other things, increasing traffic to the offeror server 140, promoting the product or service to encourage purchase thereof or for establishing some form of relationship between the offeror and the user as a consumer.

Server system 110 comprises at least one processing device, and may comprise multiple processing devices operating in cooperation and/or parallel to operate web server functions 128 (e.g. using a hypertext transfer protocol daemon (HTTPD)), data processing functions and data storage and retrieval functions (e.g. using structured query language (SQL) support 132) in conjunction with database 130. Server system 110 may also comprise scripting language support 131, such as Microsoft™ ASP, ASP.NET or PHP (which are examples of scripting languages). Server system 110 may comprise or have access to suitable non-volatile data storage separate to database 130 for storing executable program code to enable server system 110 to perform its functions, including those functions described herein. Such program code comprises an operating system 124 and a promotional offer management module (as one of a number of software modules 150) for managing processing and communications functions in relation to the promotional offers. Offeror server 140 and affiliate server may comprise a similar architecture and similar server-related functions to server system 110, except that they will not have access to database 130.

Database 130 may comprise a localised or distributed database storing data records for the various promotional offers, as well as user feedback (if any) received in relation to each promotional offer. The time and date of user feedback received, for example in the form of positive or negative votes as to the efficacy or the redeemability of the promotional offer and any received user comments, is also stored in database 130. Database 130 may also be used by server system 110 to store data regarding the number of times a promotional offer is selected and may store data for the purpose of rating or ranking the various promotional offers according to user feedback and/or other measures of efficacy or reliability of the promotional offers.

The affiliate server 145 may be hosted by or associated with an entity that tracks traffic and transactions to invoice the offeror and compensate the entity that operates server system 110 for sales that resulted from traffic referred through server system 110. For example, the entity hosting or associated with affiliate server 145 may be Commission Junction, which provides affiliate marketing.

Referring in particular to FIG. 2, the example display 200 of a promotional offer is described in further detail. Display 200 may be provided as one of a series of such displays on a single page displayed using HTML and other program code executed by browser application 125. Each display 200 comprises a display portion 210 and a feedback portion 220. The display portion 210 comprises a promotional code 212, also referred to as a coupon code, and a description 218 of the promotion. The display portion 210 further comprises a statistical information display section 230 that provides information regarding the efficacy of the promotional offer, for example including user success rate, user perceived reliability, aggregated positive and negative endorsements or votes from users or any other statistical information to assist a prospective consumer to assess the likelihood of successfully taking advantage of the promotional offer.

In some embodiments, the statistical information 230 may comprise a histogram 232 representative of the historical user votes received in relation to the particular promotional offer. The histogram 232 may comprise a number of bars displayed in series and indicative of the number and value (positive or negative) of user votes on the perceived reliability or redeemability of the promotional offer.

Display portion 210 further comprises a flash object 213, such as an empty flash movie, that is transparent and overlaid on the promotional code 212. Alternatively, flash object 213 may comprise one or more images that display the promotional code 212.

When a user navigates to the promotional code 212, for example by moving a pointer 211 over the promotional code 212 or the flash object 213, client side code, such as JavaScript, served by server 110 and executing on browser application 125 causes an informational message 215 to appear adjacent to promotional code 212. As illustrated by example in FIG. 2, the information message 215 may include the text "click to copy code and open site" or other words to that effect.

As described further below in relation to FIG. 3, program code provided by server system 110, such as in the form of JavaScript executed by browser application 125, operates to cause display of the information message 215 upon navigation to the promotional code 212 or flash object 213. Further code, such as JavaScript or ActionScript or a combination of both, is provided by server system 110 to cause a new browser window to be opened (or a new display provided via the user interface) in response to selection of the flash object 213. The uniform resource locator (URL) of the new browser window is automatically directed to an address hosted by server system 110 and comprising, as part of the URL, an identifier of the promotional code 212. Simultaneously (at least as perceived by the user), ActionScript code provided by server system 110 and executed by browser application 125 causes the promotional code 212, which may comprise an alphanumeric code or other combination of characters, to be copied to a clipboard or other user-accessible temporary memory or buffer on the client computing device 120.

Feedback portion 220 comprises text 222 inviting feedback in relation to the promotional offer and positive and negative voting buttons 224, 226. Feedback portion 220 may also comprise a selectable link or button to display previously posted user comments in relation to the promotional offer and allow qualified users to post further feedback.

Selection of a positive or negative voting button 224, 226 triggers the code executing in browser application 125 to transmit a message to server system 110 indicating the Boolean status of the vote (yes/positive or no/negative), the time and date and an identification of the promotional code 212 that is the subject of the feedback. Instead of the feedback message comprising the time and date of the vote, server system 110 may record the time and date at which the feedback message is received at the server system 110. Server system 110 then records all of the voting information received in such messages as voting data in database 130.

Figure 3:
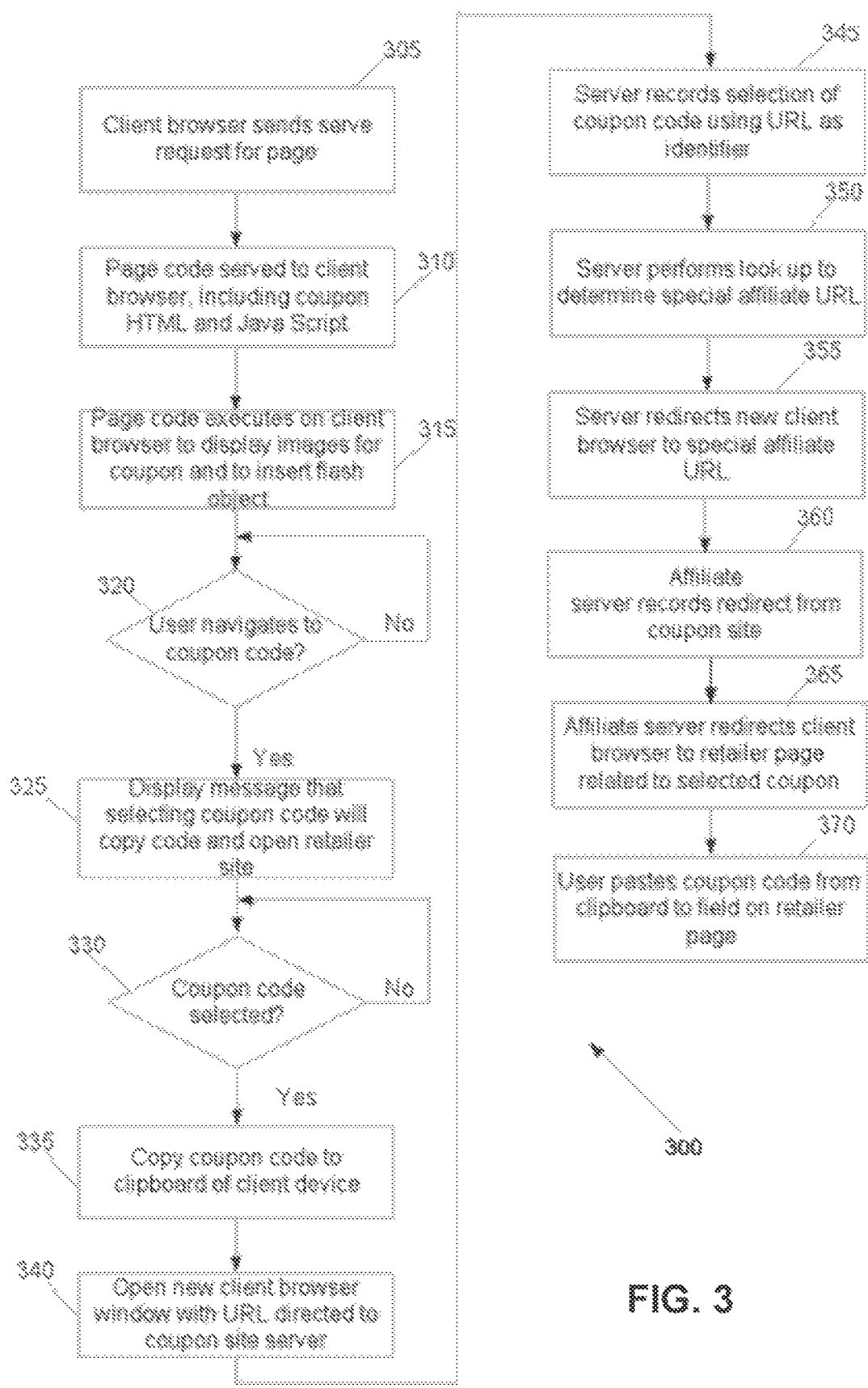
FIG. 3 is a flow chart of a method for facilitating access to a promotional offer.

Referring now to FIG. 3, a method 300 for facilitating access to a promotional offer is described in further detail. Method 300 begins at step 305, at which client browser application 125 sends a page request to server system 110 (e.g. by specifying a URL hosted by server system 110) where the requested page comprises a promotional offer or multiple promotional offers. This serve request is sent via network 115. At step 310, in response to the serve request, server system 110 serves page code to client browser application 125 over network 115. The page code includes HTML code and applets and/or JavaScript to provide one or more displays 200. This page code is then executed by the client browser application 125 at step 315 to display images for one or more promotional offers, such as display 200. The HTML code to provide display 200 may have approximately the following form:

```
<div class="coupon" id="123456">
  ...
  <td class="code">FREE100</td>
  <td class="discount">Get Free Shipping off your
$100 Purchase</td>
  ...
</div>
```

Execution of the page code also inserts or embeds flash object 213, e.g. <embed src="clicktocopy.swf?code=FREE100"/>. Voting buttons 224, 226 are embedded as selectable objects within display 200 which, when executed, cause execution of an applet to provide a message containing voting information to be sent to server system 110. The page code that embeds flash object 213 into display 200 may comprise ActionScript to enable selection of flash object 213 and display of informational message 215 upon navigation to or focus on flash object 213.

Once it is determined at step 320 that a user has navigated to or focussed (via the user interface) on the flash object 213 displaying or overlying the promotional code, then at step 325, JavaScript or ActionScript executing within client browser application 125 displays informational message 215 to indicate that selection, for example by "clicking" of the promotional code, will copy the code and open a website associated with the promotional offer.

Once it is determined at step 330 that the flash object 213 displaying or overlying the promotional code 212 has been selected, then at step 335, an ActionScript code segment automatically copies the promotional code 212 (e.g.

"FREE100") to the clipboard or other user-accessible temporary storage of the client computing device 120. Simultaneously or immediately before or after step 335, client browser application 125 executes the ActionScript (or JavaScript called by the ActionScript) of flash object 213 to open a new client browser window using the same client browser application 125 at step 340. Alternatively, the ActionScript or JavaScript may cause a new browser display to be provided over the previous display instead of opening an entirely new window. This may be desirable where, for example, the client computing device 120 has a relatively small visual display area, such as for mobile handheld devices, that may become too crowded if more than one browser window is open.

The new client browser window or display is opened at step 340 with a URL passed to client device 120 with the page code, automatically directing the client browser application 125 to transmit a serve request to a URL hosted by the server system 110. This URL may be specifically associated by server system 110 with the promotional code 212 and may include the promotional code 212 as part of the URL or may include an identifier of that promotional code 212. Direction of the server request to this specific URL allows the server system 110 to recognize that the promotional code 212 has been selected and to record this event at step 345 for tracking purposes.

At step 350, server 110 then performs a look-up, for example in database 130, to determine a special URL provided by an affiliate server 145 to enable tracking of traffic to the offeror server 140 via server system 110. The affiliate URL may not always be found by the look-up.

If the look-up at step 350 is successful, then at step 355, server system 110 redirects the new client browser window or display in browser application 125 to the special affiliate URL hosted by the affiliate server 145, which records at step 360 the corresponding serve request as being associated with server system 110, so that acknowledgement or reward can be provided for the client referral through server system 110. If the affiliate URL cannot be found, a URL associated with offeror server 140 may be used instead.

Following step 355, Affiliate server 145 automatically redirects the new window of the client browser application 125 to a suitable URL hosted by the offeror server 140, at step 365. The offeror server 140 may then serve page code to browser application 125 relating to the promotional offer or the product or service to which the selected promotional offer relates. The redirections at steps 355 and 365 occur automatically without user input and may not be visible unless displayed by the browser application 125 in the http address field.

At the user's option, the user may directly paste the coupon code stored in the clipboard or other user accessible memory into a field on a page hosted by offeror server 140 to thereby claim or redeem the promotional offer, for example as part of an online purchase procedure. This pasting may be performed at step 370 using a suitable user interface feature provided by the client computing device 120, such as a key combination shortcut via a keyboard or via a drop down menu option, for example provided by the web browser application 125 or via a hot key or right click.

In alternative embodiments, step 340 may be performed with an affiliate URL instead of the client system URL, thereby bypassing the client system 110 and sending the serve request directly to affiliate server 145. As the affiliate URL is a specific URL assigned for use by server system 110, this URL can be used by affiliate server 145 to track traffic referred through server system 110. In such alternative embodiments, steps 345 to 355 are not performed and the modified step 340 is followed by step 360.

If the user closes the new browser window and then selects a different coupon code, that coupon code will be copied at step 335 and steps 340 to 365 (or just steps 340, 360 and 365 if a direct affiliate URL is used) may be performed in relation to the different coupon code. Alternatively, those steps may not be performed again, in order to avoid user annoyance because of the appearance of another new browser window.

For computer security reasons, copying of code into a clipboard of a client computing device 120 is generally not permitted by many client browser applications 125. However, this prohibition against copying to the clipboard does not exist in relation to selection of a flash object, such as flash object 213. By copying the promotional code 212 to the clipboard, the user can with greater convenience and less navigational effort readily paste the coupon code into the requisite field on the offeror server's web page to claim or redeem the promotional offer. This greater convenience for users can result in a higher rate of redemption of the promotional offer than might otherwise be the case. Additionally, websites, such as may be hosted by server system 110, providing such convenient user interface functionality, may be more highly favoured and trafficked by users.

In this description, the term "flash object" or similar terms, is intended to indicate an electronic media object, for example having a .swf extension, according to the Adobe™ Flash specification (Adobe Flash being a trademarked name of an example of a multimedia platform used to enhance interactivity of web pages). Additionally, the references to JavaScript and ActionScript are intended to be understood as examples of client-side script executable in a browser application and are not intended to be limiting. Other scripting languages may be used, to the extent that they are capable of performing the functions described herein. Further, some embodiments contemplate using an object other than a flash object as the basis for copying the promotional code, where that other object has associated therewith script or code that would be permitted by the browser application to copy characters to the clipboard or another similar user-accessible memory.

Embodiments are described herein by way of example, with reference to the drawings. The embodiments are intended to be provided by way of non-limiting example and some modifications of the described embodiments may be apparent to those of ordinary skill in the art without departing from the spirit and scope of the embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

I claim:
1. A system configured to operate a content-distributing website in a network in which a third party server tracks content distribution, the content-distributing website facilitating content engagement by serving instructions that when executed on a client computing device effectuate loading a user selected content code into a clipboard memory of the client computing device for pasting into an input of another website, the system comprising:
one or more processors; and
memory storing instructions that when executed by the one or more processors effectuate operations comprising:
receiving, from a client computing device, at a content-distributing website server, one or more serve requests for a web content item; and
sending, in response to the one or more serve requests, from the content-distributing website server, the web content item to the client computing device, wherein the web content item is sent with instructions that indicate how to display the web content item in a webpage, the sent instructions being configured to effectuate, when executed by a browser application of the client computing device, operations comprising:
displaying, in a webpage specified at least in part by the sent instructions, at the client computing device in the browser application of the client computing device, the webpage with the content item, the content item comprising:
a content code and a user-selectable input that, upon selection, causes client-side code to execute, the client-side code being sent responsive to the one or more serve requests for the web content item, and
a description corresponding to the content code;
receiving a selection of the user-selectable input by a user; and
in response to receiving the selection of the user-selectable input by the user, performing operations comprising:
copying the content code from within a secure sandbox of the browser application to a clipboard memory of the client computing device, the copying to the clipboard memory being caused at least in part by the selection of the user-selectable input, wherein:
the copying is implemented with a basis for copying the content code to outside the secure sandbox by the browser application; and
the copying is performed using an object other than a flash object as the basis for copying the content code, the object having associated therewith client-side code permitted by the browser application of the client computing device to copy characters to the clipboard memory.

2. A method, comprising:
receiving, from a client computing device, at a server, one or more requests for content of a website; and
sending, in response to the one or more requests, from the server, the content to the client computing device, wherein the content is sent with instructions that indicate how to display the content in a webpage of the website, the sent instructions being configured to effectuate, when executed by a browser application of the client computing device, operations comprising:
displaying, in a webpage specified at least in part by the sent instructions, at the client computing device in the browser application of the client computing device, the webpage with the content, the content comprising:
a user-selectable input that, upon selection, causes client-side code to execute, the client-side code being sent responsive to the one or more requests for the content, and
a description of a coupon having a coupon code, the coupon code being associated with the user-selectable input;
receiving a selection of the user-selectable input by a user; and
in response to receiving the selection of the user-selectable input by the user, performing operations comprising:
copying the coupon code from within a secure sandbox of the browser application to a clipboard memory of the client computing device, the copying to the clipboard memory being caused at least in part by the selection of the user-selectable input, wherein:
the copying is implemented with a basis for copying the coupon code to outside the secure sandbox by the browser application; and
the copying is performed using an object other than a flash object as the basis for copying the coupon code, the object having associated therewith client-side code sent responsive to the one or more requests for the content and permitted by the browser application of the client computing device to copy characters to the clipboard memory.

3. A tangible, non-transitory, machine-readable medium storing instructions that when executed by one or more processors effectuate a first set of operations comprising:
receiving, from a client computing device, at a server, one or more serve requests for a coupon code to be displayed by a browser application of the client computing device; and
sending, in response to the one or more serve requests, from the server, the coupon code to the client computing device, wherein the coupon code is associated with instructions executed by the browser application that indicate how to display the coupon code by the browser application of the client computing device, the instructions being configured to effectuate, when executed by the browser application of the client computing device, a second set of operations comprising:
displaying, by the browser application of the client computing device, the coupon code,
with a user-selectable input that, upon selection, causes client-side code to be executed by the browser application, and
a description of an offer corresponding to the coupon code;
receiving a selection of the user-selectable input by a user; and
in response to receiving the selection of the user-selectable input by the user, performing a third set of operations comprising:
automatically copying the coupon code to a clipboard memory of the client computing device, the copying to the clipboard memory being caused at least in part by the selection of the user-selectable input, wherein:
the copying is implemented with a basis for copying the coupon code outside a secure sandbox of the browser application; and
the copying is performed using an object other than a flash object as the basis for copying the coupon code, the object having associated therewith client-side code permitted by the browser application of the client computing device to copy characters to the clipboard memory.

4. The medium of claim 3, wherein:
the server is a content-distributing website server; and
the coupon code is displayed within a webpage served by the content-distributing website server.

5. The medium of claim 3, wherein the first set of operations comprising:
at the server, sending to the client computing device a uniform resource locator (URL) of a third-party server that tracks content distribution and instructions that direct the client computing device to the URL of the third party server and instructions that when executed by the client computing device effectuate operations comprising:
sending a third serve request to the third party server addressed by the URL, wherein the third serve request identifies an entity distributing the coupon code, such that the third party server receives information sufficient to cause the third serve request to be associated with the entity by a redeemer of the coupon code;
receiving, from the third party server instructions that direct the client computing device to a merchant website to which the coupon code pertains; and
displaying the merchant website on the client computing device, the merchant website including a field to enter the coupon code, wherein while displaying the merchant web site, the coupon code remains in clipboard memory of the client computing device such that, after receiving direction from the user, the client computing device is operative to paste the coupon code from the clipboard memory of the client computing device into the field to provide the coupon code to the merchant website.

6. The medium of claim 3, wherein the displaying by the browser application comprises:
a webpage having a positive and a negative voting button, wherein selection of the positive or negative voting buttons causes the client computing device to transmit a message to the server indicating a status of a vote.

7. The medium of claim 3, wherein the displaying by the browser application comprises:
concurrently displaying the coupon code and the description of the offer corresponding to the coupon code so that
the coupon code is visually associated with the user-selectable input.

8. The medium of claim 3, the third set of operations comprising:
executing means for copying characters to the clipboard.

9. The medium of claim 3, wherein:
the coupon code is displayed overlaid on a webpage while the coupon code and the user-selectable input at least partially overlap one another.

10. The medium of claim 3, wherein:
at least some of the client-side code is sent responsive to the one or more requests by the server;
the user-selectable input comprises a button that has an embedded reference to the client-side code paired with the coupon code such that the client-side code has access to the coupon code;
the offer corresponding to the coupon code is a coupon having a coupon identifier;

the coupon code is different from the coupon identifier; and
selection of the user-selectable input causes the browser application to navigate to an affiliate network server and identify a publisher of the coupon code to the affiliate network server before the affiliate network server redirects the browser application to a website at which the coupon is redeemable.

11. A method having a first set of operations, comprising:
receiving, from a client computing device, at a server, one or more serve requests for a coupon code to be displayed by a browser application of the client computing device; and
sending, in response to the one or more serve requests, from the server, the coupon code to the client computing device, wherein the coupon code is associated with instructions executed by the browser application that indicate how to display the coupon code by the browser application of the client computing device, the instructions being configured to effectuate, when executed by the browser application of the client computing device, a second set of operations comprising:
displaying, by the browser application of the client computing device, the coupon code,
the coupon code being associated with a user-selectable input that, upon selection, causes client-side code to be executed by the browser application, and
a description of a coupon having the coupon code;
receiving a selection of the user-selectable input by a user; and
in response to receiving the selection of the user-selectable input by the user, performing a third set of operations comprising:
automatically copying the coupon code to a clipboard memory of the client computing device, the copying to the clipboard memory being caused at least in part by the selection of the user-selectable input, wherein:
the copying is implemented with a basis for copying the coupon code outside a secure sandbox of the browser application; and
the copying is performed using an object other than a flash object as the basis for copying the coupon code, the object having associated therewith client-side code permitted by the browser application of the client computing device to copy characters to the clipboard memory.

12. The method of claim 11, wherein:
the server is a content-distributing website server; and
the coupon code is displayed within a webpage served by the content-distributing website server.

13. The method of claim 11, wherein the first set of operations comprising:
at the server, sending to the client computing device a uniform resource locator (URL) of a third-party server that tracks content distribution and instructions that direct the client computing device to the URL of the third party server and instructions that when executed by the client computing device effectuate operations comprising:
sending a third serve request to the third party server addressed by the URL, wherein the third serve request identifies an entity distributing the coupon code to the third party server, such that the third party server receives information sufficient to cause the third serve request to be associated with the entity by a redeemer of the coupon code;

receiving, from the third party server instructions that direct the client computing device to a merchant website to which the coupon code pertains; and displaying the merchant website on the client computing device, the merchant website including a field to enter the coupon code, wherein while displaying the merchant web site, the coupon code remains in clipboard memory of the client computing device such that, after receiving direction from the user, the client computing device is operative to paste the coupon code from the clipboard memory of the client computing device into the field to provide the coupon code to the merchant website.

14. The method of claim 11, wherein the displaying comprises:

a webpage having a positive and a negative voting button, wherein selection of the positive or negative voting buttons causes the client computing device to transmit a message to the server indicating a status of a vote.

15. The method of claim 11, wherein the displaying comprises:

concurrently displaying the coupon code and the description of an offer corresponding to the coupon code, while the coupon code is visually associated with the user-selectable input.

16. The method of claim 11, the third set of operations comprising:

executing means for copying characters to the clipboard.

17. The method of claim 11, wherein:

the coupon code is displayed overlaid on a webpage so that the coupon code and the user-selectable input at least partially overlap one another.

18. The method of claim 11, wherein:

at least some of the client-side code is sent responsive to the one or more requests by the server;

the user-selectable input comprises a button that has an embedded reference to the client-side code paired with the coupon code such that the client-side code has access to the coupon code;

an offer corresponding to the coupon code is a coupon having a coupon identifier;

the coupon code is different from the coupon identifier; and selection of the user-selectable input causes the browser application to navigate to an affiliate network server and identify a publisher of the coupon code to the affiliate network server before the affiliate network server redirects the browser application to a website at which the coupon is redeemable.

19. The method of claim 11, comprising:

steps for facilitating access to a promotional offer.

20. The method of claim 11, comprising:

automatically opening a new window of the browser application in response to the user selecting the user-selectable input or otherwise selecting an offer corresponding to the coupon code, wherein the new window displays a website of a merchant associated with the offer corresponding to the coupon code; and the server is a server system comprising multiple processing devices and a database storing promotional offers.

* * * * *